(12) United States Patent
Her et al.

(10) Patent No.: US 12,496,164 B2
(45) Date of Patent: *Dec. 16, 2025

(54) METHOD AND DEVICE FOR GENERATING ORTHODONTIC TEETH ALIGNMENT SHAPE

(71) Applicant: DDH INC., Seoul (KR)

(72) Inventors: Soo Bok Her, Seoul (KR); Joo Han Lee, Seoul (KR); Sung Joo Cho, Seoul (KR); Joon Mo Moon, Seoul (KR)

(73) Assignee: DDH INC., Seoul (KR)

( * ) Notice: Subject to any disclaimer, the term of this patent is extended or adjusted under 35 U.S.C. 154(b) by 618 days.

This patent is subject to a terminal disclaimer.

(21) Appl. No.: 17/793,457

(22) PCT Filed: Nov. 9, 2020

(86) PCT No.: PCT/KR2020/015590
§ 371 (c)(1),
(2) Date: Jul. 18, 2022

(87) PCT Pub. No.: WO2021/145544
PCT Pub. Date: Jul. 22, 2021

(65) Prior Publication Data
US 2023/0068041 A1  Mar. 2, 2023

(30) Foreign Application Priority Data

Jan. 16, 2020 (KR) .......................... 10-2020-0006053

(51) Int. Cl.
*G06F 30/10* (2020.01)
*A61C 7/00* (2006.01)
(Continued)

(52) U.S. Cl.
CPC ................ *A61C 7/002* (2013.01); *A61C 9/00* (2013.01); *A61C 9/0046* (2013.01); *G06F 30/10* (2020.01);
(Continued)

(58) Field of Classification Search
CPC ......... A61C 7/002; A61C 9/00; A61C 9/0046; A61C 2007/004; G06F 30/10; G06F 2111/16
(Continued)

(56) References Cited

U.S. PATENT DOCUMENTS

| 5,533,895 A | 7/1996 | Andreiko et al. |
| 2007/0168152 A1* | 7/2007 | Matov .................... A61C 7/002 702/155 |

(Continued)

FOREIGN PATENT DOCUMENTS

| CN | 105260542 A | 1/2016 |
| JP | 2007-525289 A | 9/2007 |

(Continued)

*Primary Examiner* — Stephen S Hong
*Assistant Examiner* — Tionna M Burke
(74) *Attorney, Agent, or Firm* — Bridgeway IP Law Group, PLLC; Sang Ho Lee; Hyun Woo Shin

(57) ABSTRACT

Provided is a method for generating an orthodontic teeth alignment shape for the orthodontic treatment of a patient. According to the present invention, there is provided a method for generating an orthodontic teeth alignment shape, the method including the steps of: acquiring a patient's teeth shape information; extracting specific points of respective teeth within a given range of at least one of the patient's upper and lower jaws, based on the acquired teeth shape information; comparing the patient's arch form produced by connecting the specific points to one another with a plurality of standard arch forms stored in a database; selecting the standard arch form that is most similar to the patient's arch form from the plurality of standard arch forms stored in the (Continued)

database, based on the comparison result; and generating the orthodontic teeth alignment shape based on the selected standard teeth alignment form.

20 Claims, 13 Drawing Sheets

(51) Int. Cl.
 *A61C 9/00* (2006.01)
 *G06F 111/16* (2020.01)
(52) U.S. Cl.
 CPC ..... *A61C 2007/004* (2013.01); *G06F 2111/16* (2020.01)
(58) Field of Classification Search
 USPC .......................................................... 382/128
 See application file for complete search history.

(56) References Cited

U.S. PATENT DOCUMENTS

| | | | | |
|---|---|---|---|---|
| 2011/0137626 | A1* | 6/2011 | Matov | A61C 7/08 |
| | | | | 703/2 |
| 2016/0175068 | A1 | 6/2016 | Cai et al. | |
| 2018/0225842 | A1* | 8/2018 | Wang | G06T 7/73 |

FOREIGN PATENT DOCUMENTS

| | | |
|---|---|---|
| KR | 10-2005-0082526 A | 8/2005 |
| KR | 10-2013-0039533 A | 4/2013 |
| KR | 10-2015-0039028 A | 4/2015 |
| KR | 10-2015-0139465 A | 12/2015 |

* cited by examiner

FACIAL AXIS POINT

METHOD AND DEVICE FOR GENERATING ORTHODONTIC TEETH ALIGNMENT SHAPE

TECHNICAL FIELD

The present invention relates to a method and device for generating an orthodontic teeth alignment shape for the orthodontic treatment of a patient.

BACKGROUND ART

Orthodontic treatments for correcting teeth alignments are generally conducted for the medical or beauty purposes. The orthodontic treatment is performed to evenly correct the misaligned teeth in position as well as to correct various skeleton disharmony that may be generated in a person's growing and living processes, so that the functions of normal teeth may be exerted well to provide a healthy oral structure. The skeleton disharmony has an influence on the outer appearance of a patient as well as his or her facial skeleton structure, which is one of important treatment subjects.

So as to allow the teeth to be fixed in right position or at normal angles during the orthodontic treatment, generally, a treatment in which a given force is applied to a tooth to move the tooth to a desired position within the alveolar bone is generally carried out. The orthodontic treatment may be performed through various methods, and for example, an orthodontic appliance using brackets and a wire made of a metal or ceramic material may be used. If the orthodontic appliance is used, the brackets are fixed to the surfaces of the teeth as the orthodontic treatment subjects, and an orthodontic wire is connected to the brackets, so that through the elastic or restoring force of the wire, an orthodontic force is applied to the teeth to gradually correct the misaligned teeth.

In the orthodontic treatment in which various orthodontic appliances are provided, therefore, there is a need to produce a standard teeth alignment shape as a target of a patient's orthodontic treatment and an orthodontic teeth alignment shape for making an orthodontic appliance based on the standard teeth alignment shape.

DISCLOSURE

Technical Problem

Accordingly, it is an object of the present invention to provide a method and device for generating an orthodontic teeth alignment shape for the orthodontic treatment of a patient.

Technical Solution

To accomplish the above-mentioned objects, according to an aspect of the present invention, there is provided a method for generating an orthodontic teeth alignment shape for the orthodontic treatment of a patient, the method including the steps of: acquiring a patient's teeth shape information; extracting specific points of respective teeth within a given range of at least one of the patient's upper and lower jaws, based on the acquired teeth shape information; comparing the patient's arch form produced by connecting the specific points to one another with a plurality of standard arch forms stored in a database; selecting the standard arch form that is most similar to the patient's arch form from the plurality of standard arch forms stored in the database, based on the comparison result; and generating the orthodontic teeth alignment shape based on the selected standard teeth alignment form.

Desirably, the specific points are Facial Axis points (FA points) of the respective teeth.

Desirably, the method may further include the step of projecting the extracted specific points of the respective teeth on a reference plane, the patient's arch form produced by connecting the specific points projected on the reference plane to one another being compared with the plurality of standard arch forms.

Desirably, the step of projecting the extracted specific points of the respective teeth on a reference plane may include the steps of: determining the facial axial points of the respective teeth within the given range; calculating the three-dimensional coordinates of the determined facial axis points with respect to arbitrary reference points; producing the reference plane using the calculated coordinates; and projecting the respective facial axis points on the produced reference plane and calculating the two-dimensional coordinates of the respective facial axis points projected on the reference plane.

Desirably, the step of producing the reference plane is performed to produce the reference plane where the sum of the vertical distances from the respective facial axis points is minimal.

Desirably, the step of producing the reference plane is performed to produce the reference plane where the E value is calculated by the following expression with the vertical distances $e_1$ to $e_n$ from the facial axis points, $$E = \sqrt{e_1^2 + e_2^2 + e_3^2 + \ldots + e_n^2}$$

wherein the E value is minimal.

Desirably, the plurality of standard arch forms are sorted by performing statistical cluster analysis for the arch forms studied for a plurality of normal occlusion samples and expressed as cubic functions on two-dimensional plane with x- and y-axes.

Desirably, the plurality of standard arch forms are represented by the following cubic functions, $$y = \beta_1 \times x^3 + \beta_2 \times x^2 (x > 0)$$

$$y = -\beta_1 \times x^3 + \beta_2 \times x^2 (x < 0)$$

The standard arch forms have different coefficients $\beta_1$ and $\beta_2$ from one another.

Desirably, the step of comparing the patient's arch form produced by connecting the specific points to one another with a plurality of standard arch forms stored in a database is performed by determining a curve expressed as the cubic function that is most similar to the patient's arch form produced by connecting the facial axis points of the respective teeth and comparing the determined curve with the plurality of standard arch forms.

Desirably, the step of comparing the patient's arch form produced by connecting the specific points to one another with a plurality of standard arch forms stored in a database is performed by determining the curve that is most similar to the patient's arch form based on a minimal value of an area or distance of a space made by overlaying the plurality of standard arch forms and the patient's arch form on top of each other.

Desirably, the step of selecting the standard arch form that is most similar to the patient's arch form from the plurality of standard arch forms is performed by selecting the standard arch form that has the most similar curvature to the determined curve, based on a difference between the coefficients $\beta_1$ and $\beta_2$ of the standard arch forms and the coefficients $\beta_1$ and $\beta_2$ of the curve.

Desirably, the step of acquiring a patient's teeth shape information may include the step of distinguishing the patient's teeth from the gum.

Desirably, the plurality of standard arch forms may include three standard arch forms having different values of coefficients $\beta_1$ and $\beta_2$ from one another on each of the upper and low jaws.

To accomplish the above-mentioned objects, according to another aspect of the present invention, there is provided a device for generating an orthodontic teeth alignment shape for the orthodontic treatment of a patient, including: a processor; and a memory for storing instructions executable by the processor, wherein the processor executes the instructions to acquire a patient's teeth shape information, extract specific points of respective teeth within a given range of at least one of the patient's upper and lower jaws, based on the acquired teeth shape information, compare the patient's arch form produced by connecting the specific points to one another with a plurality of standard arch forms stored in a database, select the standard arch form that is most similar to the patient's arch form from the plurality of standard arch forms stored in the database, based on the comparison result, and generate the orthodontic teeth alignment shape based on the selected standard teeth alignment form.

Desirably, the specific points are Facial Axis points (FA points) of the respective teeth.

Desirably, the processor projects the extracted specific points of the respective teeth on a reference plane and compares the patient's arch form produced by connecting the specific points projected on the reference plane to one another with the plurality of standard arch forms.

Desirably, the processor determines the facial axial points of the respective teeth within the given range, calculates the three-dimensional coordinates of the determined facial axis points with respect to arbitrary reference points, produces the reference plane using the calculated coordinates, projects the respective facial axis points on the produced reference plane, and calculates the two-dimensional coordinates of the respective facial axis points projected on the reference plane.

Desirably, the processor produces the reference plane where the sum of the vertical distances from the respective facial axis points is minimal.

Desirably, the processor produces the reference plane where the E value calculated by the following expression with the vertical distances $e_1$ to $e_n$ from the facial axis points is minimal, $$E=\sqrt{e_1^2+e_2^2+e_3^2+...+e_n^2}$$

wherein the E value is minimal.

Desirably, the plurality of standard arch forms are sorted by performing statistical cluster analysis for the arch forms studied for a plurality of normal occlusion samples and expressed as cubic functions on two-dimensional plane with x- and y-axes.

Desirably, the plurality of standard arch forms are represented by the following cubic functions, $$y=\beta_1 \times x^3 + \beta_2 \times x^2 (x>0)$$

$$y=-\beta_1 \times x^3 + \beta_2 \times x^2 (x<0)$$

The standard arch forms have different coefficients $\beta_1$ and $\beta_2$ from one another.

Desirably, the processor determines a curve expressed as the cubic function that is most similar to the patient's arch form produced by connecting the facial axis points of the respective teeth and compares the determined curve with the plurality of standard arch forms.

Desirably, the processor determines the curve that is most similar to the patient's arch form, based on a minimal value of an area or distance of a space made by overlaying the plurality of standard arch forms and the patient's arch form on top of each other.

Desirably, the processor selects the standard arch form that has the most similar curvature to the determined curve, based on a difference between the coefficients $\beta_1$ and $\beta_2$ of the standard arch forms and the coefficients $\beta_1$ and $\beta_2$ of the curve.

Desirably, the processor distinguishes the patient's teeth from the gum.

Desirably, the plurality of standard arch forms may include three standard arch forms having different values of coefficients $\beta_1$ and $\beta_2$ from one another on each of the upper and low jaws.

Advantageous Effects

According to the present invention, the method and device for generating the orthodontic teeth alignment shape for the orthodontic treatment of a patient can generate the orthodontic teeth alignment shape for correcting the patient's teeth alignment, more rapidly, conveniently, and accurately and apply it to the patient's teeth alignment.

DESCRIPTION OF DRAWINGS

The present invention will be easily understood by the following detailed description and the attached drawings, and reference numerals in the drawings may represent structural elements.

MODE FOR INVENTION

Figure 1:
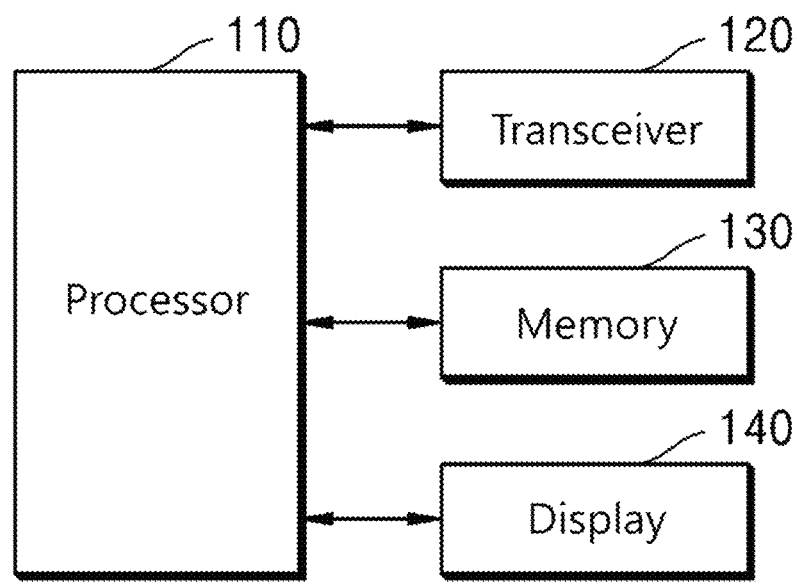
FIG. 1 is a block diagram showing an orthodontic teeth alignment shape generating device according to the present invention.

Hereinafter, the present invention is disclosed with reference to the attached drawings wherein the corresponding parts in the embodiments of the present invention are indicated by corresponding reference numerals and the repeated explanation on the corresponding parts will be avoided. If it is determined that the detailed explanation on the well known technology related to the present invention makes the scope of the present invention not clear, the explanation will be avoided for the brevity of the description.

In the description, functional blocks and various steps as will be discussed in the description are just examples according to the present invention. Other functional blocks may be used as other examples according to the present invention within the whole scope of the present invention. According to the present invention, further, one or more functional blocks are indicated as individual blocks, but they may become combinations of various hardware and software executing the same function as each other. For example, the functional blocks of the description may be implemented by one or more microprocessors or circuit components for given functions. Further, for example, the functional blocks of the description may be implemented by various programming or scripting languages. The functional blocks may be implemented by an algorithm executed in one or more processors. Further, the conventional technologies in the specification may be adopted for electronic environment setting, signal processing, and/or data processing.

The terms "unit" and "module" described in the specification indicate a unit for processing at least one function or operation, which may be implemented by hardware, software, or a combination thereof. The "unit" and "module" may be implemented by a program stored in an addressed storage media and executed by a processor.

For example, the "unit", and "module" may be implemented by components such as software components, object oriented software components, class components, and task components, processes, functions, attributes, procedures, subroutines, segments of a program code, drivers, firmware, micro codes, circuits, data, database, data structures, tables, arrays, and variables.

In the entire specification, when it is said that one element is described as being "connected" to the other element, one element may be directly connected or coupled to the other element, but it should be understood that another element may be present between the two elements. When it is said that one portion is described as "includes" any component, further, one element may further include other components unless no specific description is suggested.

Further, the connection lines or connection members among the components as shown in the drawings exemplarily show functional connections and/or physical or circuit connections. In a real device, the components may be connected through replaceable or added various functional, physical, or circuit connections.

Terms used in this application are used to only describe specific exemplary embodiments and are not intended to restrict the present invention. An expression referencing a singular value additionally refers to a corresponding expression of the plural number, unless explicitly limited otherwise by the context. In this application, terms, such as "comprise", "include", or 'have", are intended to designate those characteristics, numbers, steps, operations, elements, or parts which are described in the specification, or any combination of them that exist, and it should be understood that they do not preclude the possibility of the existence or possible addition of one or more additional characteristics, numbers, steps, operations, elements, or parts, or combinations thereof. That is, when a certain portion "comprises or includes" a certain component, this indicates that the other components are not excluded and may be further included unless specially described otherwise.

Some of components of the present invention may not be necessary in performing the essential functions of the present invention, but be selected to just improve the performance of the present invention. The present invention may be provided only with the necessary components for performing the essential functions thereof except the selective components for just improving the performance thereof, and therefore, the configuration where only the necessary components are provided except the selective components used for improving the performance may be included within the scope of the present invention.

FIG. 1 is a block diagram showing an orthodontic teeth alignment shape generating device according to the present invention.

Referring to FIG. 1, an orthodontic teeth alignment shape generating device 100 according to the present includes a processor 110, a transceiver 120, a memory 130, and a display 140. However, all of the components as shown in FIG. 1 are not essential components for constituting the orthodontic teeth alignment shape generating device 100. That is, the orthodontic teeth alignment shape generating device 100 may be constituted of a larger number of components than those as shown in FIG. 1, and otherwise, it may be constituted of a smaller number of components than those as shown in FIG. 1.

The orthodontic teeth alignment shape generating device 100 acquires a patient's teeth shape information. To perform orthodontic treatment, it is necessary to measure the patient's oral cavity. The patient's teeth shape information includes the shape, position, and direction of a plurality of teeth located in the oral cavity. The teeth shape information may include the subgingival area below the gingival line. The orthodontic teeth alignment shape generating device 100 may be configured to have a teeth shape information acquiring unit adapted to directly acquire the patient's teeth shape information or may be configured to receive the patient's teeth shape information that is pre-generated from the outside.

According to the present invention, the patient's teeth shape information may be acquired by means of scanning. The scanning is performed by using an optical 3D scanner or an information acquiring device such as treatment CT to acquire the patient's oral cavity information and to then obtain the entire teeth shape information by processing the acquired oral cavity information. The scanning method using the optical 3D scanner or CT is useful because the teeth shape information can be acquired, without having any physical contact with the patient's teeth or gum.

According to the present invention, the patient's teeth shape information may be acquired by means of plaster casting. The plaster casting is performed by applying a plaster material curable to the patient's oral cavity, making impressions of the teeth in the patient's oral cavity through the cured teeth shapes, and acquiring the teeth shape information. However, the plaster casting may make the patient feel uncomfortable and require longer time than the 3D scanning in acquiring the teeth shape information.

The teeth shape information acquired by means of the scanning or plaster casting is converted into a 3D model through digital processing. The patient's teeth shape information that is converted into the 3D model through the display 140 is outputted and checked by the patient.

According to the present invention, the teeth shape information may include both of the shape of the plurality of teeth and the shape of the gum. The orthodontic teeth alignment shape generating device 100 distinguishes the plurality of teeth and the gum included in the teeth shape information from each other. For example, the orthodontic teeth alignment shape generating device 100 distinguishes the plurality of teeth from the gum, based on the color tone and brightness differences therebetween and pre-set boundaries therebetween. However, the information used to perform the distinguishing operation of the orthodontic teeth alignment shape generating device 100 may not be limited to the above-mentioned examples.

The orthodontic teeth alignment shape generating device 100 extracts specific points of respective teeth within a given range of at least one of the patient's upper and lower jaws, based on the acquired teeth shape information. In this case, the specific points may be the Facial Axis points (FA points) of the respective teeth, and a detailed explanation of the facial axis points will be discussed later with reference to FIGS. 4 and 5.

The orthodontic teeth alignment shape generating device 100 projects the extracted specific points on a reference plane and compares the patient's arch form that is produced by connecting the specific points projected on the reference plane to one another with a plurality of standard arch forms stored in a database. In this case, the reference plane may become the plane where the sum of the vertical distances from the facial axis points of the respective teeth is minimal. To do this, the orthodontic teeth alignment shape generating device 100 calculates three-dimensional coordinates of the facial axis points of the respective teeth and produces the reference plane where the sum of the vertical distances from the facial axis points of the respective teeth is minimal by using the calculated coordinates.

Based on the comparison result, the orthodontic teeth alignment shape generating device 100 selects the standard arch form that is most similar to the patient's arch form from the plurality of standard arch forms stored in the database. In this case, the plurality of standard arch forms may be sorted by performing statistical cluster analysis for the arch forms studied for normal occlusion samples. In specific, hundreds of patients with normal occlusion, not malocclusion, are investigated to sort a plurality of limited groups with the well arranged arch form having no distortion such as asymmetry through cluster analysis, as the standard arch forms.

Further, the orthodontic teeth alignment shape generating device 100 generates the orthodontic teeth alignment shape based on the selected standard teeth alignment shape information. The orthodontic teeth alignment shape is the shape for modeling an orthodontic appliance for converting the patient's teeth into the selected standard teeth alignment shape. According to the present invention, the orthodontic teeth alignment shape may be provided to convert the patient's teeth into the standard teeth alignment shape at once, but so as to reduce the load applied to the patient, the orthodontic teeth alignment shape may be provided a plurality of times to gradually convert the patient's teeth into the standard teeth alignment shape so that the entire conversion target becomes the standard teeth alignment shape.

The processor 110 controls the whole operation of the orthodontic teeth alignment shape generating device 100. The processor 110 performs the basic calculation and logic and input/output operations for acquiring and processing the teeth alignment shape information to thus execute at least one instruction. The instruction is provided to the processor 10 from the memory 130. That is, the processor 110 executes the instruction according to the program code stored in a recording device such as the memory 130. Otherwise, the instruction is transmitted to the orthodontic teeth alignment shape generating device 100 through the transceiver 120 and thus provided to the processor 110.

The transceiver 120 may include one or more components for performing communication between the orthodontic teeth alignment shape generating device 100 and a server or external device.

The memory 130 is adapted to store the program for the processing and control of the processor 110 and the data inputted to or outputted from the orthodontic teeth alignment shape generating device 100. Further, the memory 130 may store the database including the plurality of standard teeth shape information.

The memory 130 may include at least one of a flash memory, a hard disk memory, a multimedia card micro type memory, a card type memory (for example, SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk.

The display 140 serves to display the information processed in the orthodontic teeth alignment shape generating device 100. For example, the display 140 displays a user interface for providing to the patient the patient's teeth alignment shape information, the standard teeth alignment shape information as a target of the orthodontic treatment, or the orthodontic teeth alignment shape for making the orthodontic appliance.

The display 140 may be used as an input device as well as the output device. The display 140 may include at least one of a liquid crystal display, a thin film transistor-liquid crystal display, an organic light-emitting diode, a flexible display, a 3D display, and an electrophoretic display.

Figure 2:
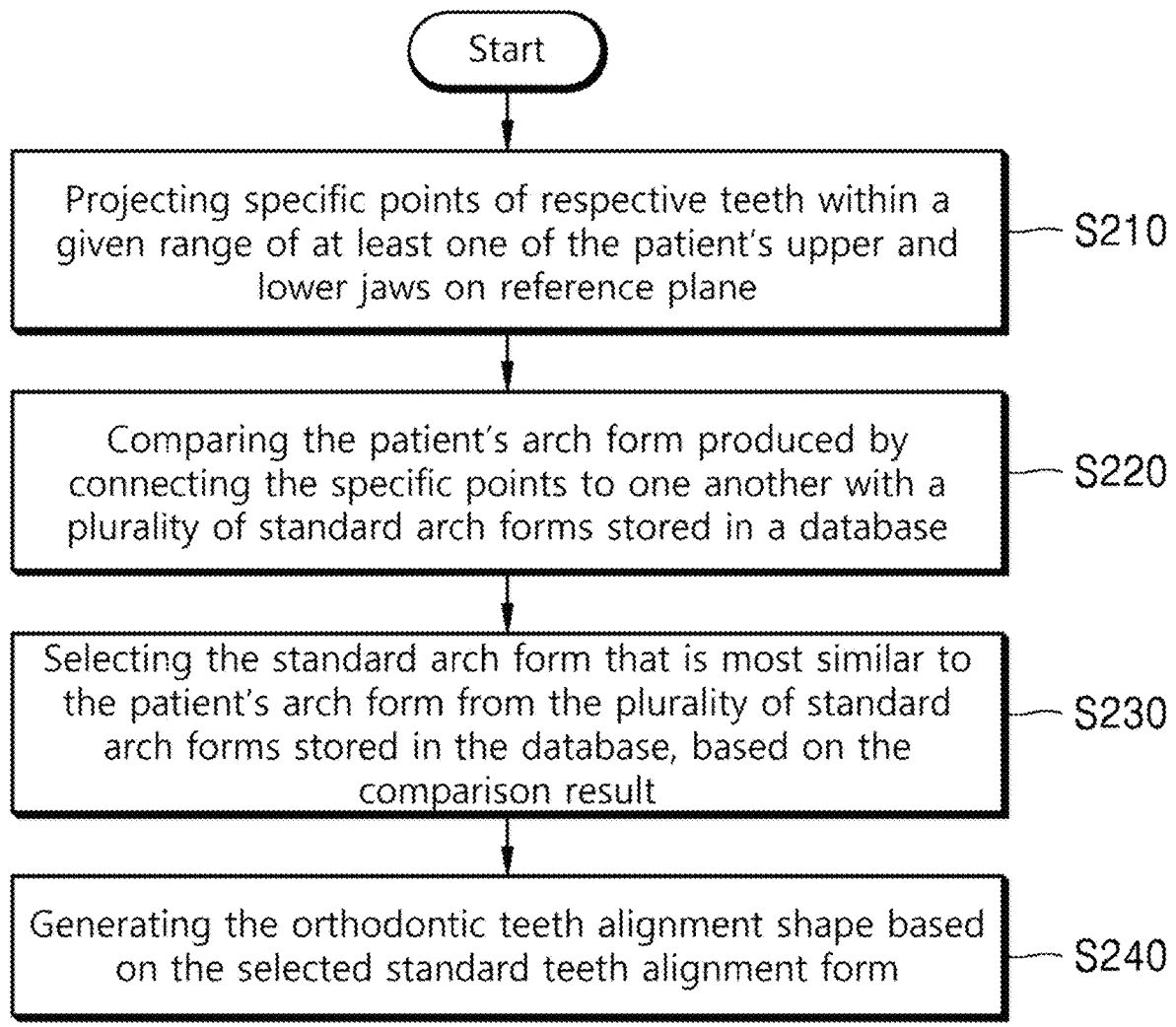
FIG. 2 is a flowchart showing an orthodontic teeth alignment shape generating method according to the present invention.

FIG. 2 is a flowchart showing an orthodontic teeth alignment shape generating method according to the present invention.

First, a patient's teeth shape information is acquired (at step S210).

After that, specific points of respective teeth within a given range of at least one of the patient's upper and lower jaws are extracted based on the acquired teeth shape information (at step S220). In this case, the specific points may be the Facial Axis points (FA points) of the respective teeth.

Next, the extracted specific points of the respective teeth are projected on a reference plane (at step S230).

According to the present invention, further, the facial axis points of the respective teeth with the given range are determined, and the three-dimensional coordinates of the determined facial axis points are calculated with respect to arbitrary reference points. Using the calculated coordinates, the reference plane where the sum of the vertical distances from the respective facial axis points is minimal is produced, and the respective facial axis points are projected on the produced reference plane. Next, two-dimensional coordinates of the respective facial axis points projected on the reference plane are calculated.

After that, the patient's arch form produced by connecting the specific points to one another is compared with a plurality of standard arch forms stored in a database (at step S240). In this case, a curve expressed as the cubic function that is most similar to the patient's arch form produced by connecting the facial axis points of the respective teeth is determined, and the determined curve is compared with the plurality of standard arch forms.

Figure 3:
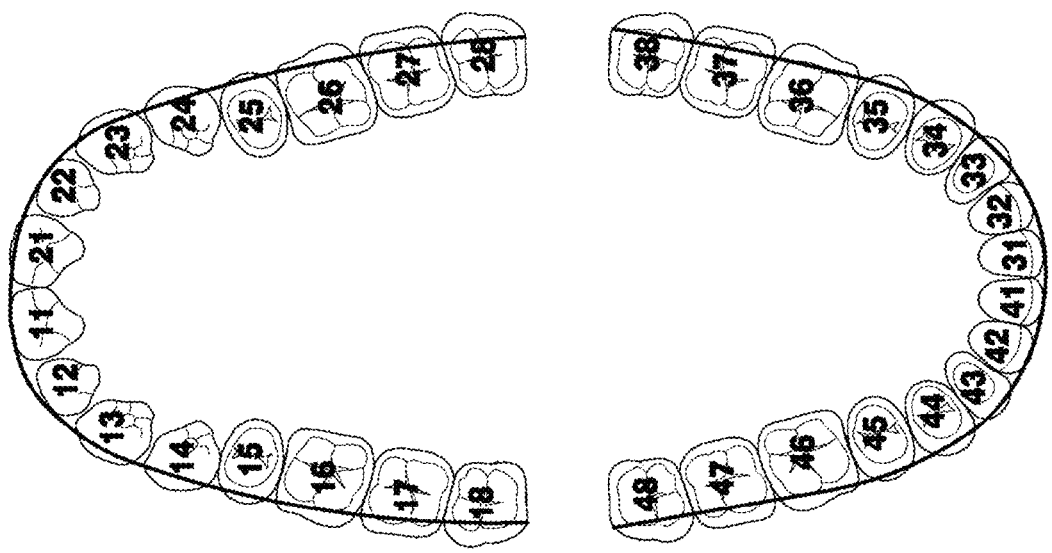
FIG. 3 is a top view showing arch forms according to the present invention.
Figure 3:
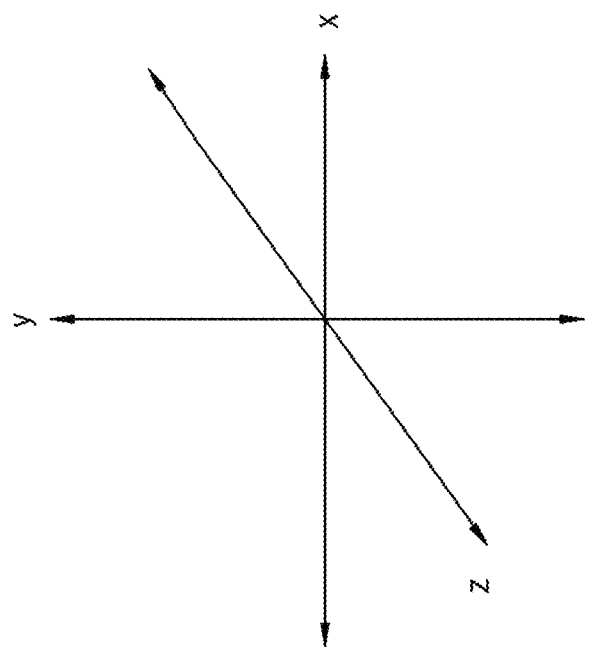

In this case, as shown in FIG. 3, the arch form represents an arch curvedly surrounding the teeth seen on the occlusal plane.

Based on the comparison result, the standard arch form that is most similar to the patient's arch form is selected from the plurality of standard arch forms stored in the database (at step S250). In this case, the standard arch form that has the most similar curvature to the determined curve is selected, based on a difference between the coefficients of each standard arch form and the coefficients of the curve determined as most similar to the patient's arch form.

After that, the orthodontic teeth alignment shape is generated based on the selected standard teeth alignment form (at step S260).

Figure 4:
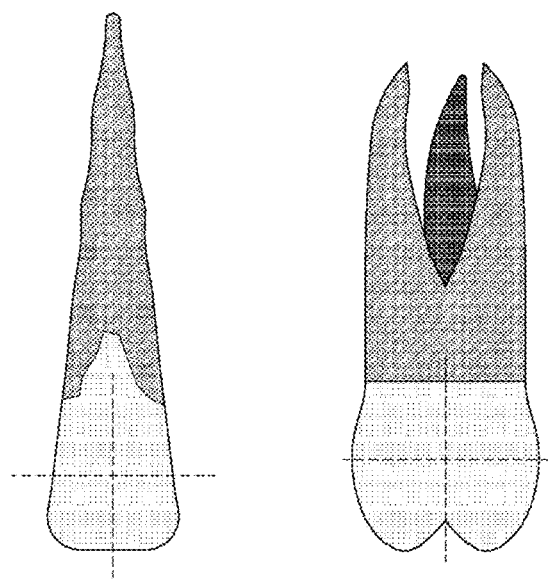
FIG. 4 is an exemplary view showing a step of determining a facial axis point according to the present invention.

FIG. 4 is an exemplary view showing a step of determining a facial axis point according to the present invention. FIG. 4 shows an example of a tooth having a crown and a root.

Referring to FIG. 4, the facial axis point of the tooth is the bisector point of the clinical crown separated from the gingival in occlusion, that is, the crossing point of the axes as shown. The orthodontic teeth alignment shape generating device 100 distinguishes the long axes of the teeth based on the respective teeth shapes and determines the facial axis points of the respective teeth according to the long axes, without having any input of an operator.

Figure 5:
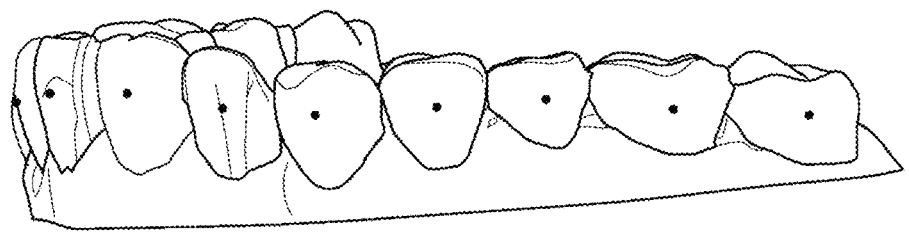
FIG. 5 is a perspective view showing a step of setting facial axis points on a plurality of teeth according to the present invention.

FIG. 5 is a perspective view showing a step of setting facial axis points on a plurality of teeth according to the present invention.

Referring to FIG. 5, the facial axis points of the respective teeth are represented by points. As mentioned above, the line connecting the facial axis points of the respective teeth represents the arch form.

Referring to FIG. 5, further, the facial axis points of the respective teeth are selected independently of each other. Accordingly, the moving quantities of the respective facial axis points based on preset weights may be calculated for the respective teeth.

Figure 6A:
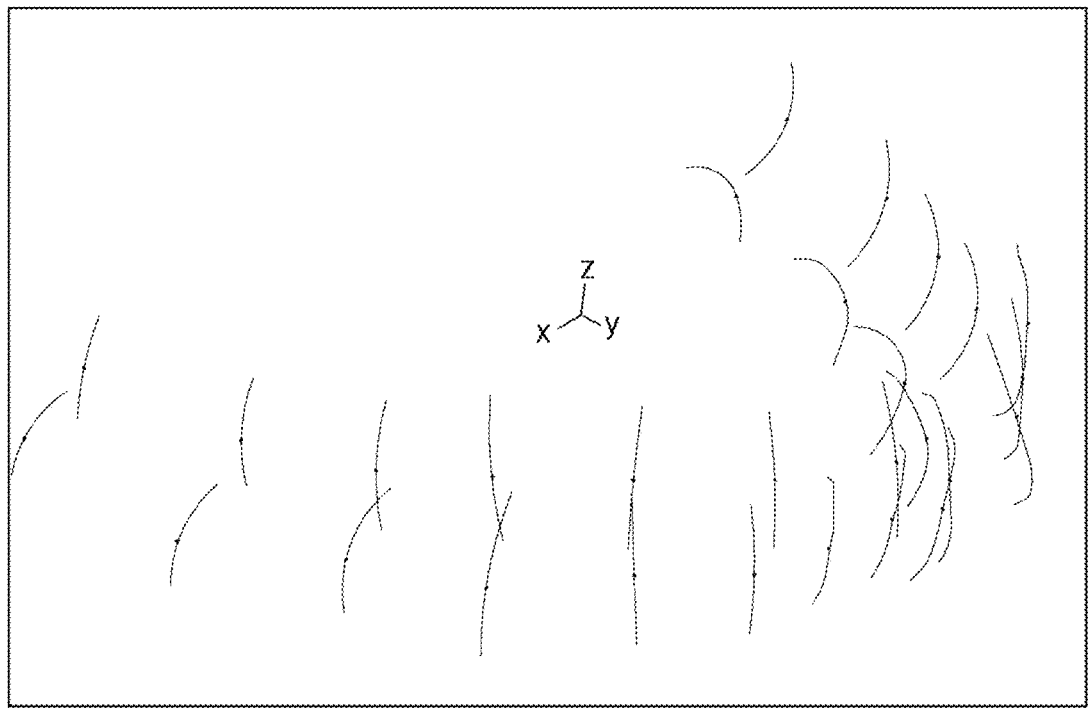
FIGS. 6A and 6B are graphs showing a step of determining three-dimensional coordinates of the facial axis points of the plurality of teeth according to the present invention.
Figure 6B:
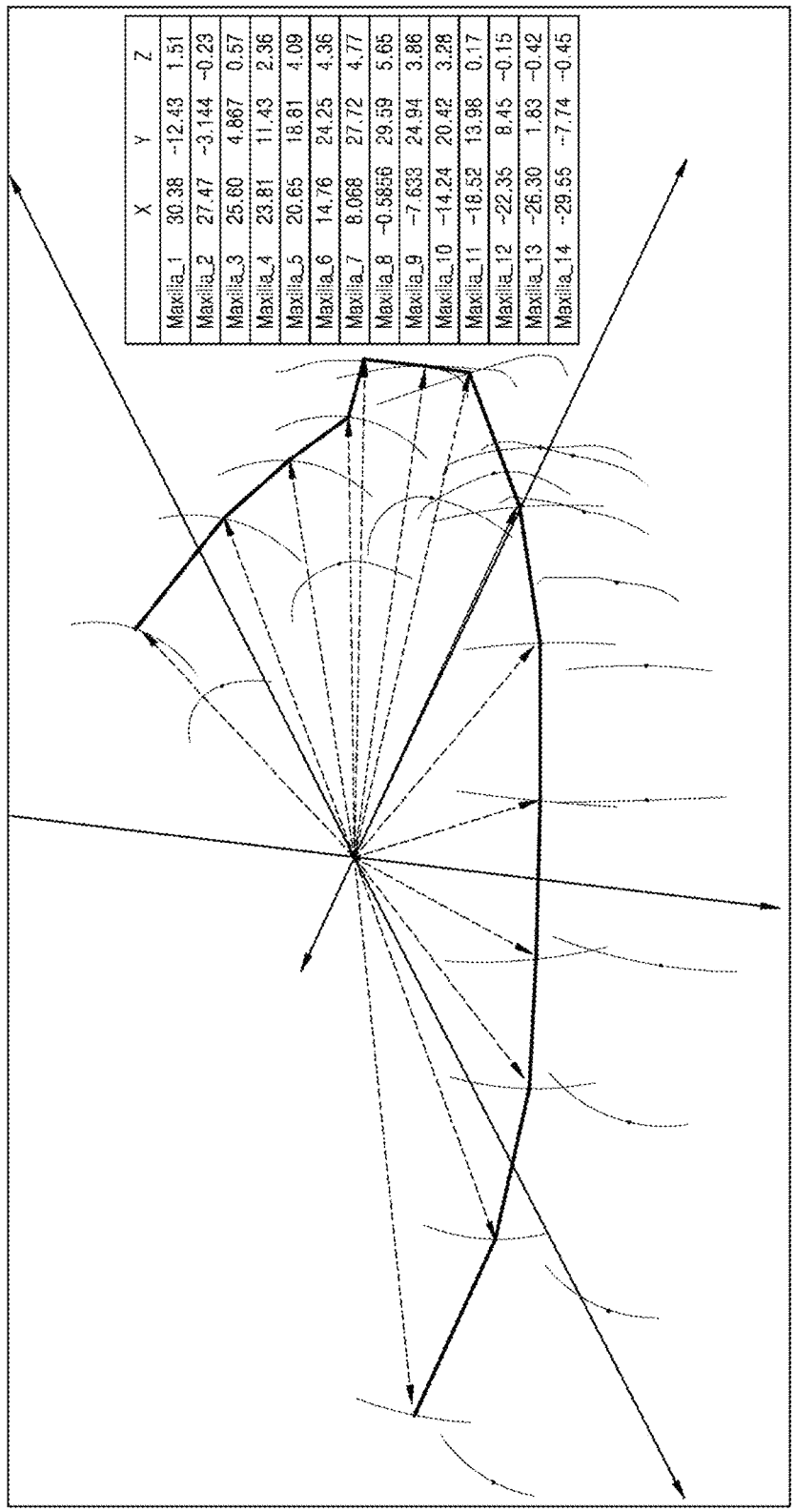

FIGS. 6A and 6B are graphs showing a step of determining three-dimensional coordinates of the facial axis points of the plurality of teeth according to the present invention.

The determined facial axis points of the respective teeth may be represented as coordinates in three-dimensional space, and as shown in FIG. 6A, the three-dimensional coordinates of the facial axis points are calculated based on an arbitrary reference point. The arbitrary reference point is desirably set to exist in the inside of the patient's arch form produced by connecting the facial axis points to one another.

Referring to FIG. 6B, x-, y- and z-axes extend from the arbitrary reference point to calculate the three-dimensional coordinates of the respective facial axis points. In this case, the three-dimensional coordinates of the reference point is 0, 0, 0. FIG. 6B shows the three-dimensional coordinates of the facial axis points of the upper jaw, for the conveniences of the description.

Figure 7:
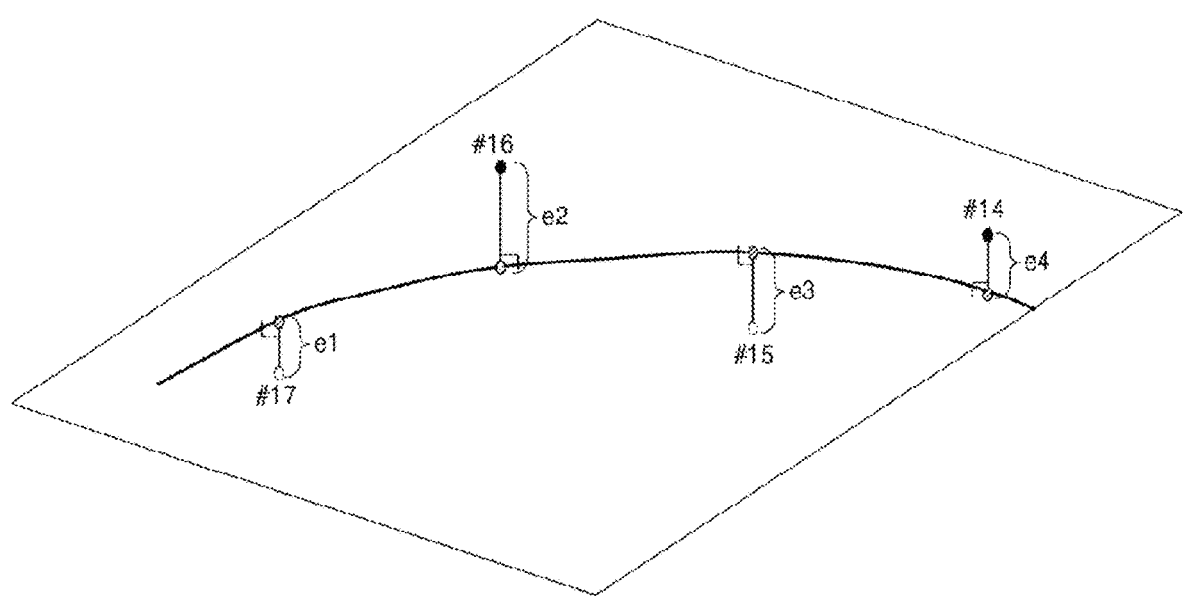
FIG. 7 is a graph showing a step of setting a reference plane according to the present invention.

FIG. 7 is a graph showing a step of setting a reference plane according to the present invention.

According to the present invention, the reference plane is formed to re-generate the two dimensional coordinates of the facial axis points of the respective teeth. In this case, the reference plane may become the plane where the sum of the vertical distances from the facial axis points of the respective teeth is minimal.

In specific, the vertical distances from the facial axis points $f_1$ to $f_n$ up to an imaginary plane may be $e_1$ to $e_n$. FIG. 7 shows the vertical distances from the facial axis points of $14^{th}$ to 17th teeth up to an imaginary plane.

In this case, the sum E of the vertical distances from the facial axis points of all of the teeth within the preset range is represented by the following expression.

$$E=\sqrt{e_1^2+e_2^2+e_3^2+\ldots+e_n^2}$$ [Expression 1]

In this case, the imaginary plane where the E value is minimal is set as the reference plane.

Figure 8A:
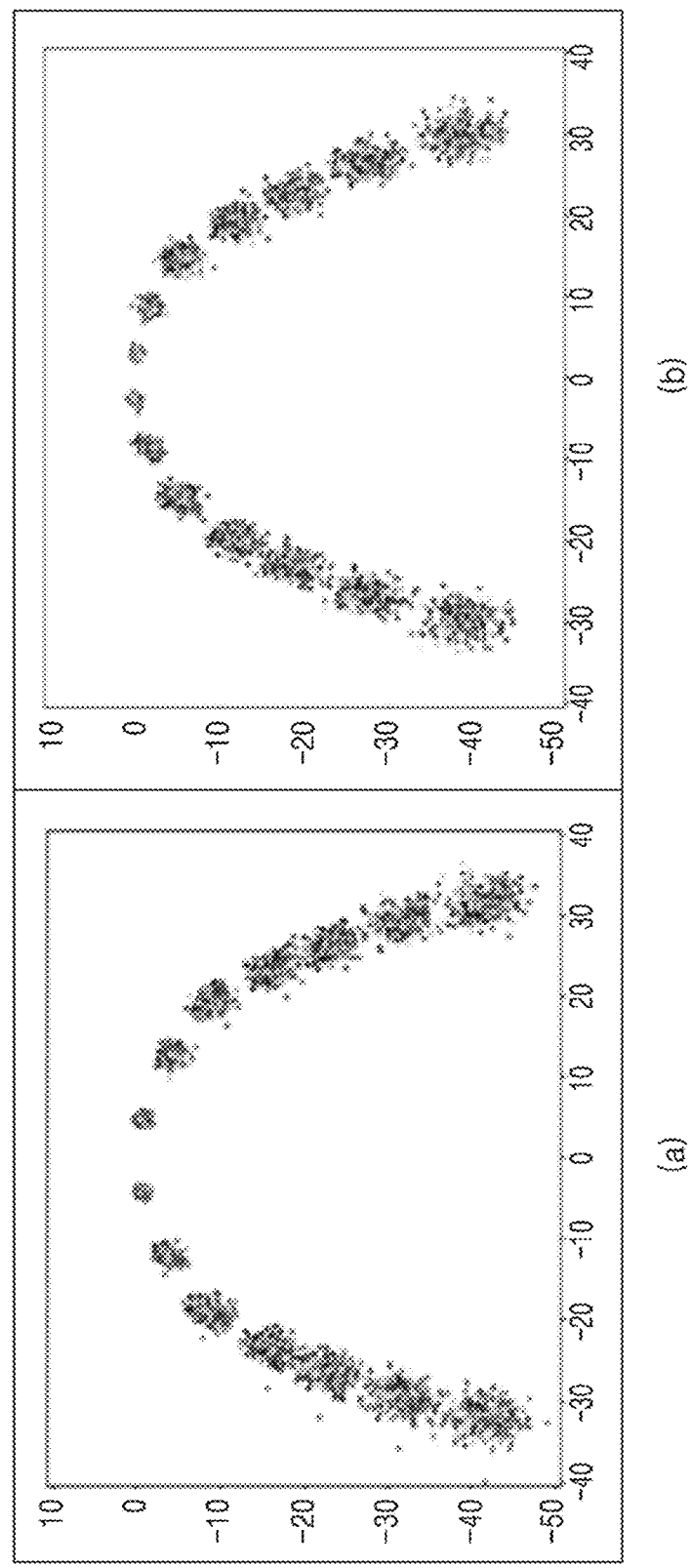
FIGS. 8A and 8B are graphs showing standard arch forms according to the present invention.
Figure 8B:
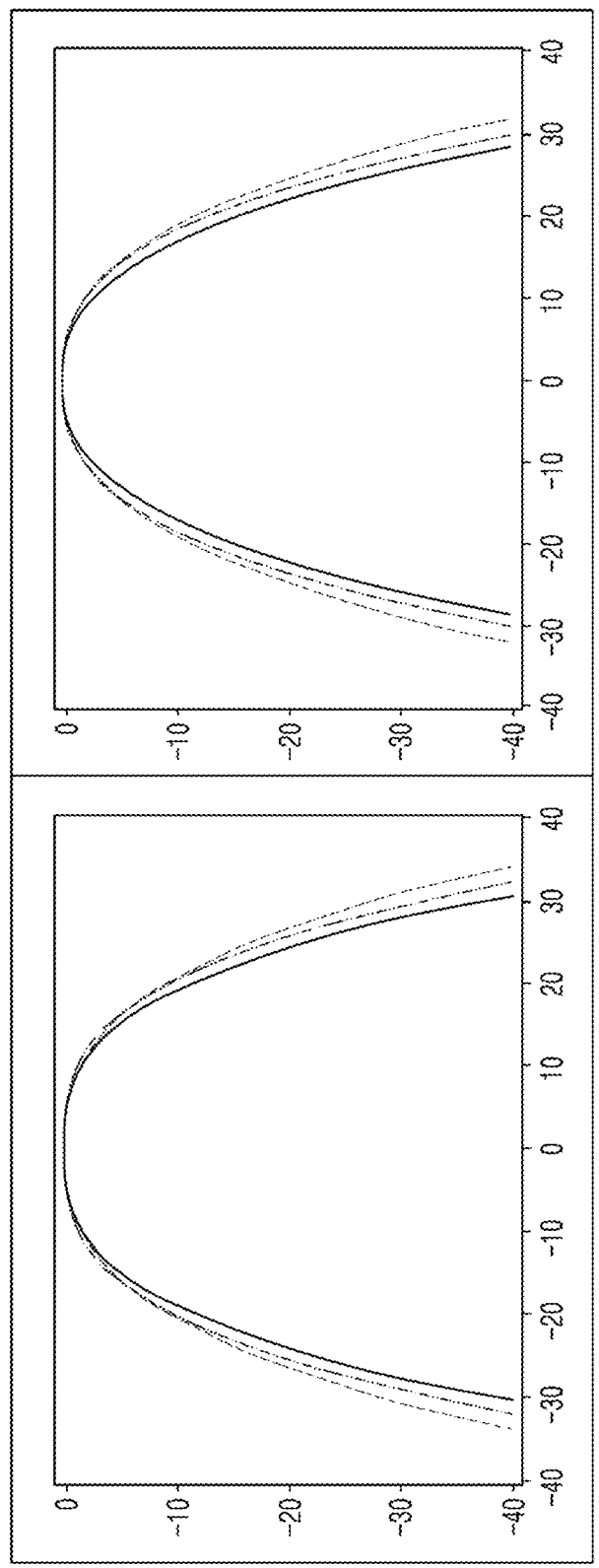

FIGS. 8A and 8B are graphs showing standard arch forms according to the present invention.

As shown in FIG. 8A, the plurality of standard arch forms are sorted by performing statistical cluster analysis for the arch forms studied for normal occlusion samples. The graph (a) show the sample analyzed for the upper jaw, and the graph (b) shows the sample analyzed for the lower jaw.

In specific, hundreds of patients with normal occlusion, not malocclusion, are investigated to sort a plurality of limited groups with the well arranged arch form having no distortion such as asymmetry through cluster analysis, as the standard arch forms.

Referring to FIG. 8B, as shown in the graph (a), three standard arch forms for the upper jaw are provided, and as shown in the graph (b), three standard arch forms for the lower jaw are provided. The three standard arch forms may have three different curvatures from one another on at least one region thereof.

However, this is just exemplary, and according to the present invention, the number of standard arch forms for each of the upper and lower jaws may be three or more. According to the present invention, further, the standard arch forms having different numbers and shapes may be set based on the races, sexes, age distributions, and the like of persons with normal occlusion as cluster analysis subjects.

Further, the standard arch form is represented by the following functions on the two-dimensional plane with x- and y-axes.

$$y=\beta_1 \times x^3+\beta_2 \times x^2 (x>0)$$

$$y=-\beta_1 \times x^3+\beta_2 \times x^2 (x<0)$$ [Expression 2]

In this case, the standard arch forms may have different coefficients $\beta_1$ and $\beta_2$ from one another.

Figure 9:
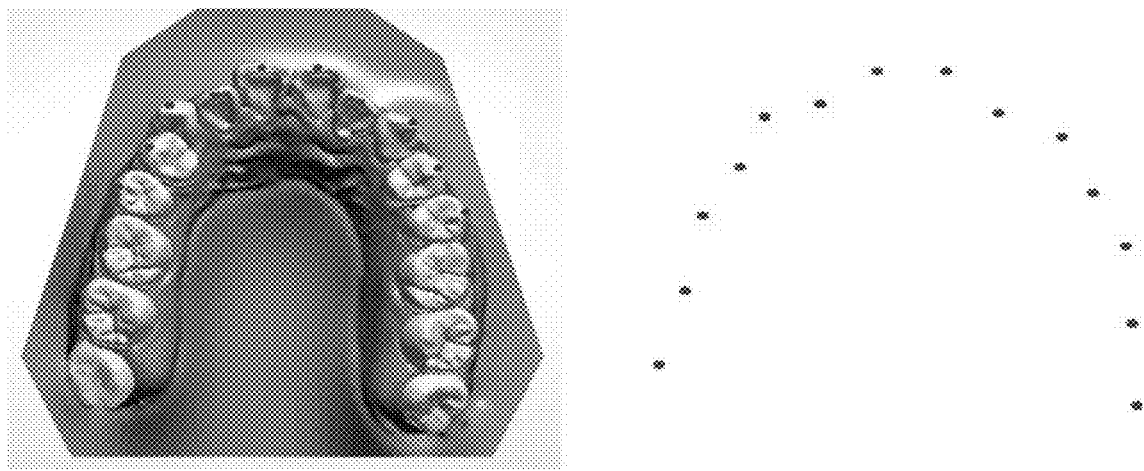
FIG. 9 is a photograph showing two-dimensional coordinates of the facial axis points newly set on the reference plane according to the present invention.

FIG. 9 is a photograph showing two-dimensional coordinates of the facial axis points newly set on the reference plane according to the present invention.

As shown in FIG. 9, the facial axis points of the fourteen teeth (the 11th to 17th teeth and the 21st to 27th teeth) with the given range are projected on the two-dimensional reference plane. Each facial axis point projected on the reference plane has two dimensional coordinates (x, y) re-set on the reference plane.

Figure 10:
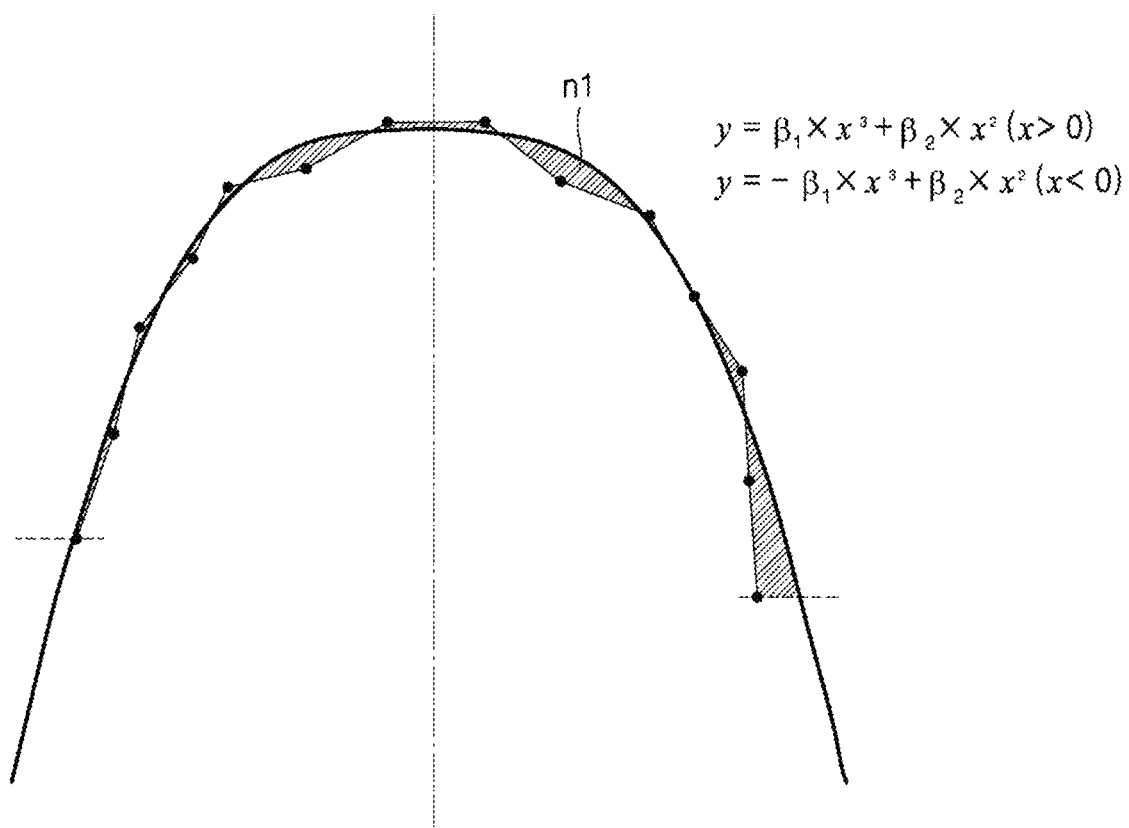
FIG. 10 is a graph showing a step of determining a cubic function curve according to the two-dimensional coordinates of the facial axis points according to the present invention.

FIG. 10 is a graph showing a step of determining a cubic function curve according to the two-dimensional coordinates of the facial axis points according to the present invention.

As shown in FIG. 10, the respective facial axis points projected on the reference plane are connected to thus produce the patient's arch form. If the patient's arch form is produced, the produced patient's arch form is compared with the plurality of standard arch forms to select the standard arch form that is most similar to the patient's arch form.

In specific, a curve expressed as the cubic function that is most similar to the patient's arch form is determined, and the determined curve is compared with the plurality of standard arch forms, thereby selecting the standard arch form that is most similar to the patient's arch form. In this case, the curve expressed as the cubic function that is most similar to the patient's arch form may be expressed as the cubic function according to the expression 2. That is, the coefficients $\beta_1$ and $\beta_2$ of the cubic function having the most similar curve to the patient's arch form may be found.

To discriminate the similarity between the patient's arch form and the curve expressed as the cubic function, according to the present invention, an area of a space n1 produced by overlaying the patient's arch form and the curve on each other is used, as shown in FIG. 10. The area of the space n1 according to the coefficients $\beta_1$ and $\beta_2$ is calculated, and the cubic function curve on which the coefficients $\beta_1$ and $\beta_2$ with which the area of the space n1 is minimal are reflected is determined.

Figure 11:
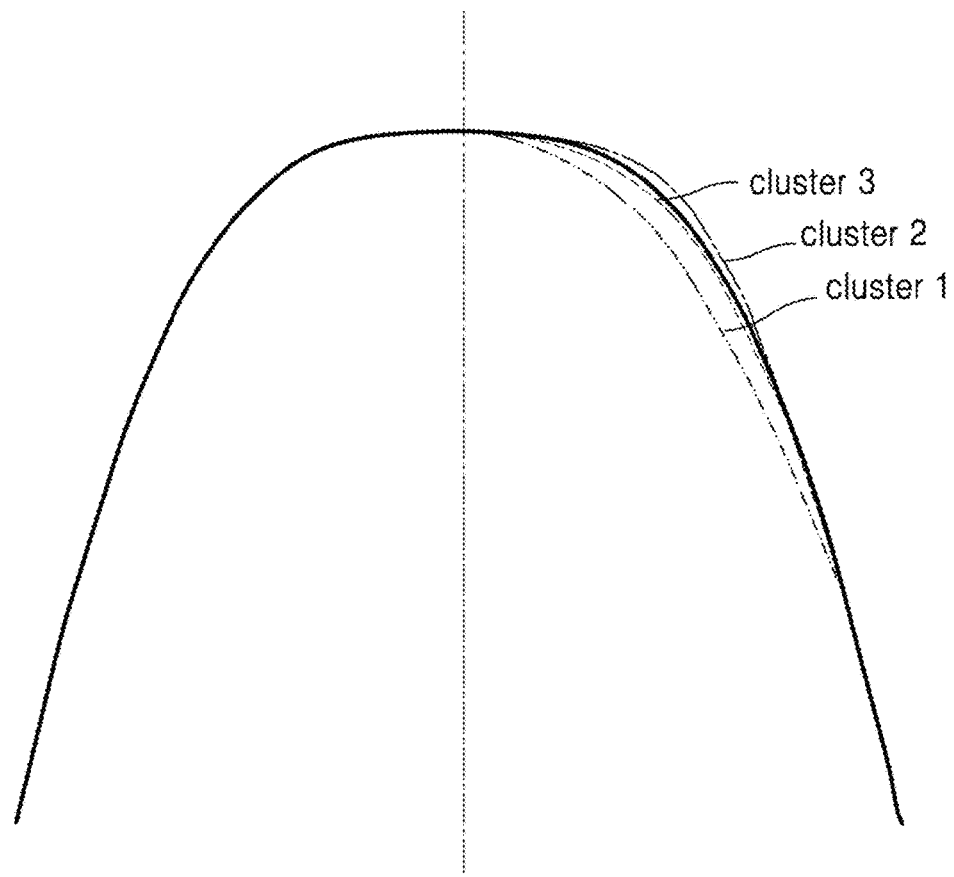
FIG. 11 is a graph showing a step of comparing the cubic function curve of the facial axis points and the standard arch forms according to the present invention.

FIG. 11 is a graph showing a step for comparing the cubic plane curve of the facial axis points and the standard arch form according to the present invention.

As shown in FIG. 11, based on a difference between the coefficients $\beta_1$ and $\beta_2$ of the standard arch forms and the coefficients $\beta_1$ and $\beta_2$ of the curve calculated by the process as shown in FIG. 10, the standard arch form having the most similar curvatures to the curve is selected.

For example, the coefficient values $\beta_1$ and $\beta_2$ of a first standard arch form (cluster 1) are a1 and b1, the coefficient values $\beta_1$ and $\beta_2$ of a second standard arch form (cluster 2) are a2 and b2, and the coefficient values $\beta_1$ and $\beta_2$ of a third standard arch form (cluster 3) are a3 and b3. In this case, the coefficient values $\beta_1$ and $\beta_2$ may be positive and/or negative numbers. The coefficient values $\beta_1$ and $\beta_2$ of the curve calculated by the process as shown in FIG. 10 are compared with the coefficient values $\beta_1$ and $\beta_2$ of the standard arch forms, and thus, the standard arch form having the smallest differences of the coefficient values may be selected.

Referring to FIG. 11, the standard arch form that is most similar to the cubic function curve calculated from the patient's arch form becomes the second standard arch form or the third standard arch form. In this case, the second standard arch form that is closest to the cubic function curve calculated from the patient's arch form may be selected as the standard arch form for generating the teeth alignment shape.

According to an embodiment of the present invention, however, the third standard arch form having a curvature in which the cubic function curve is included may be selected so as to provide a spare space in which the teeth is not tightly aligned.

Figure 12:
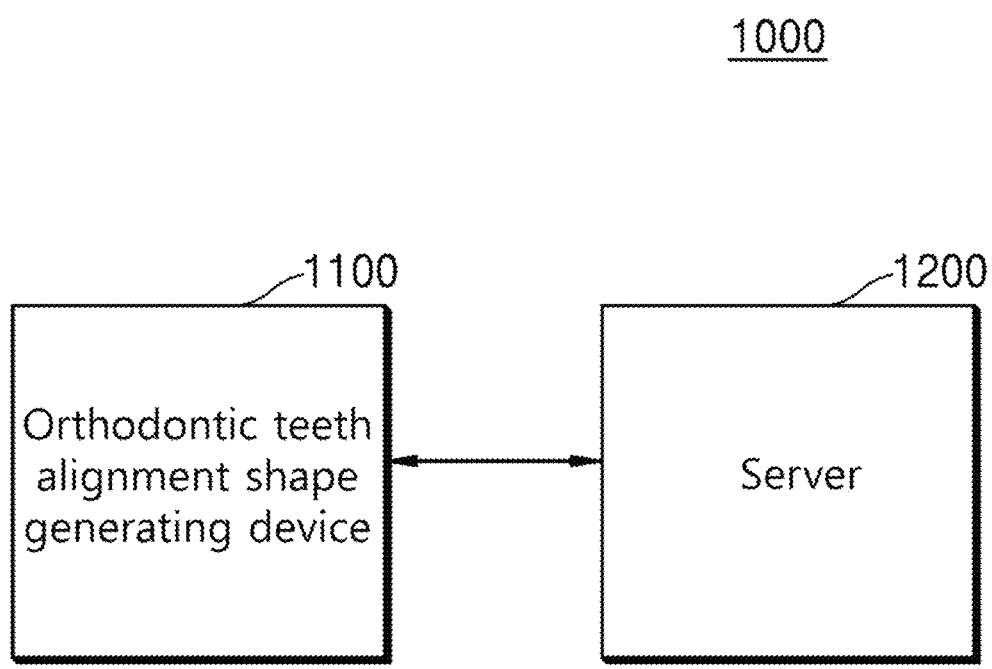
FIG. 12 is a block diagram showing an orthodontic teeth alignment shape generating system according to the present invention.

FIG. 12 is a block diagram showing an orthodontic teeth alignment shape generating system according to the present invention.

Referring to FIG. 12, an orthodontic teeth alignment shape generating system 1000 according to the present invention includes an orthodontic teeth alignment shape generating device 1100 and a server 1200.

The orthodontic teeth alignment shape generating device 1100 acquires a patient's teeth shape information. The orthodontic teeth alignment shape generating device 1100 may be configured to have a teeth shape information acquiring unit adapted to directly acquire the patient's teeth shape information or may be configured to receive the patient's teeth shape information that is pre-generated from the outside.

According to the present invention, the patient's teeth shape information may be acquired by means of scanning or plaster casting.

The orthodontic teeth alignment shape generating device 1100 extracts specific points of respective teeth within a given range of at least one of the patient's upper and lower jaws, based on the acquired teeth shape information. In this case, the specific points may be the Facial Axis points (FA points) of the respective teeth.

The orthodontic teeth alignment shape generating device 1100 projects the extracted specific points on a reference plane and compares the patient's arch form produced by connecting the specific points projected on the reference plane to one another with a plurality of standard arch forms stored in a database. In this case, the reference plane may become the plane where the sum of the vertical distances from the facial axis points of the respective teeth is minimal.

Based on the comparison result, the orthodontic teeth alignment shape generating device 1100 selects the standard arch form that is most similar to the patient's arch form from the plurality of standard arch forms stored in the database. In this case, the plurality of standard arch forms may be sorted by performing statistical cluster analysis for the arch forms studied for normal occlusion samples.

Further, the orthodontic teeth alignment shape generating device 1100 generates the orthodontic teeth alignment shape based on the selected standard teeth alignment shape information. According to the present invention, the orthodontic teeth alignment shape may be provided to convert the patient's teeth into the standard teeth alignment shape at once, but so as to reduce the load applied to the patient, the orthodontic teeth alignment shape may be provided a plurality of times to gradually convert the patient's teeth into the standard teeth alignment shape so that the entire conversion target becomes the standard teeth alignment shape.

The server 1200 performs communication with the orthodontic teeth alignment shape generating device 1100, while providing the information necessary for the operations for generating the orthodontic teeth alignment shape to the orthodontic teeth alignment shape generating device 1100. Further, the server 1200 stores an orthodontic appliance modeling provided from the orthodontic teeth alignment shape generating device 1100 and provides the modeling to an orthodontic appliance producing device to apply the modeling to a real orthodontic appliance.

Meanwhile, the various embodiments of the present disclosure as described above may be made in the form of a program instruction that can be performed through various computers, and may be implemented by a general-purpose computer operating the program instruction. Further, the structure of data used in the above-mentioned embodiments of the present disclosure may be recorded through various means on compute readable media. Moreover, the embodiments of the present disclosure may be implemented in the form of recording media having commands executable by computers such as program modules executed by computers. For example, the methods that may be implemented by software modules or algorithms are codes or program instructions readable and executable by computers, which may be stored on computer readable recording media.

The computer readable media may be arbitrary recording media accessible by computers and may include volatile and non-volatile media and separable and non-separable media. The computer readable media include magnetic storage media such as ROM, floppy disk, and hard disk and optical readable media such as CD-ROM, DVD, and the like, but they are not limited thereto. Further, the computer readable media may include computer storage media and communication media.

Further, the plurality of recording media readable by computers may be distributed over network-coupled computer systems so that the data stored in the distributed recording media, for example, program instructions and codes are executed by at least one computer.

The foregoing description of the embodiments of the invention has been presented for the purpose of illustration; it is not intended to be exhaustive or to limit the invention to the precise forms disclosed. For the brevity of the description, conventional electronic devices, control systems, software, and other functions of the system may be omitted.

The invention claimed is:

1. A method for generating an orthodontic teeth alignment shape for an orthodontic treatment of a patient, the method comprising:
    acquiring a teeth shape information of the patient;
    extracting first specific points of respective teeth within a given range of at least one of upper and lower jaws of the patient, based on the teeth shape information, each of the first specific points being a coordinate in a three-dimensional shape and being Facial Axis (FA) points corresponding to each of a plurality of teeth;
    projecting the first specific points on a two-dimensional reference plane;
    generating a patient's arch form by connecting the first specific points;
    comparing the patient's arch form produced by connecting the first specific points to one another with a plurality of standard arch forms stored in a database, each standard arch form having a two-dimensional curve shape;
    selecting the standard arch form that is most similar to the patient's arch form from the plurality of standard arch forms, based on a result from the comparing;
    generating the orthodontic teeth alignment shape based on the standard arch form; and
    transmitting the orthodontic teeth alignment shape to an orthodontic appliance generating device to apply the orthodontic teeth alignment shape to an orthodontic appliance,
    wherein the comparing the patient's arch form with the plurality of standard arch forms is performed by comparing the patient's arch form with the plurality of standard arch forms projected on the two-dimensional reference plane, and
    wherein the projecting the first specific points on the two-dimensional reference plane comprises:
    determining the first specific points of the respective teeth within the given range;
    calculating three-dimensional coordinates of the first specific points with respect to predetermined reference points;
    producing the two-dimensional reference plane by using three-dimensional coordinates, the two-dimensional reference plane having a minimal sum of vertical distances from the first specific points;
    projecting the first specific points on the two-dimensional reference plane; and
    calculating two-dimensional coordinates of the first specific points projected on the two-dimensional reference plane.

2. The method according to claim 1, wherein, in the projecting the first specific points of the respective teeth on the two-dimensional reference plane, the patient's arch form is produced by connecting the first specific points projected on the two-dimensional reference plane to one another being compared with the plurality of standard arch forms.

3. The method according to claim 1, wherein the producing the two-dimensional reference plane is performed to produce the two-dimensional reference plane where an E value calculated by a following expression with using the vertical distances $e_1$ to $e_n$ from the Facial Axis (FA) points is minimal, $$E=\sqrt{e_1^2+e_2^2+e_3^2+\ldots+e_n^2}.$$

4. The method according to claim 1, wherein the plurality of standard arch forms are sorted by performing statistical cluster analysis for the arch forms studied for a plurality of normal occlusion samples and expressed as cubic functions on a two-dimensional plane with x- and y-axes.

5. The method according to claim 4, wherein the plurality of standard arch forms are represented by following cubic functions and have different coefficients $\beta_1$ and $\beta_2$ from one another;

$$y=\beta_1 \times x^3+\beta_2 \times x^2 (x>0)$$

$$y=-\beta_1 \times x^3+\beta_2 \times x^2 (x<0).$$

6. The method according to claim 5, wherein the comparing the patient's arch form produced by connecting the first specific points to one another with the plurality of standard arch forms stored in a database is performed by determining a curve expressed as the cubic function that is most similar to the patient's arch form of the patient made by connecting the Facial Axis (FA) points of the respective teeth and comparing the curve with the plurality of standard arch forms.

7. The method according to claim 6, wherein the comparing the patient's arch form produced by connecting the first specific points to one another with the plurality of standard arch forms stored in a database is performed by determining the curve that is most similar to the patient's arch form based on a minimal value of an area or a distance of a space made by overlaying the plurality of standard arch forms and the patient's arch form on top of each other.

8. The method according to claim 7, wherein the selecting the standard arch form that is most similar to the patient's arch form from the plurality of standard arch forms is performed by selecting the standard arch form that has the most similar curvature to the curve, based on a difference between the coefficients $\beta_1$ and $\beta_2$ of the plurality of standard arch forms and the coefficients $\beta_1$ and $\beta_2$ of the curve.

9. The method according to claim 1, wherein the acquiring the patient's teeth shape information comprises distinguishing the patient's teeth from a gum.

10. The method according to claim 5, wherein the plurality of standard arch forms comprises three standard arch forms having different values of coefficients $\beta_1$ and $\beta_2$ different from one another on each of the upper and lower jaws.

11. A device for generating an orthodontic teeth alignment shape for an orthodontic treatment of a patient, the device comprising:
    a processor; and
    a memory for storing instructions executable by the processor,
    wherein the processor is configured to:
    execute the instructions to acquire a teeth shape information of the patient;
    extract first specific points of respective teeth within a given range of at least one of upper and lower jaws of the patient, based on the teeth shape information, each of the first specific points being a coordinate in a three-dimensional shape and being Facial Axis (FA) points corresponding to each of a plurality of teeth;

project the first specific points on a reference plane;

generate a patient's arch form by connecting the first specific points;

compare the patient's arch form produced by connecting the first specific points to one another with a plurality of standard arch forms stored in a database, each standard arch forms having a three-dimensional curve shape;

select the standard arch form that is most similar to the patient's arch form from the plurality of standard arch forms, based on a result from the comparing; and generate the orthodontic teeth alignment shape based on the standard teeth arch form; and transmit the orthodontic teeth alignment shape to an orthodontic appliance generating device to apply the orthodontic teeth alignment shape to an orthodontic appliance, wherein the processor is configured to compare the three-dimensional patient's arch form with the plurality of standard arch forms by comparing the three-dimensional patient's arch form with the plurality of standard arch forms projected on a two-dimensional reference plane, and wherein the processor is configured to project the first specific points on the two-dimensional reference plane by:

determining the first specific points of the respective teeth within the given range;

calculating three-dimensional coordinates of the first specific points with respect to predetermined reference points;

producing the two-dimensional reference plane by using three-dimensional coordinates, the two-dimensional reference plane having a minimal sum of vertical distances from the first specific points;

projecting the first specific points on the two-dimensional reference plane; and calculating two-dimensional coordinates of the first specific points projected on the two-dimensional reference plane.

12. The device according to claim 11, wherein the processor is configured to project the specific points of the respective teeth on the two-dimensional reference plane and compare the patient's arch form produced by connecting the specific points projected on the two-dimensional reference plane to one another with the plurality of standard arch forms.

13. The device according to claim 11, wherein the plurality of standard arch forms are sorted by performing statistical cluster analysis for the arch forms studied for a plurality of normal occlusion samples and expressed as cubic functions on a two-dimensional plane with x- and y-axes.

14. The device according to claim 13, wherein the plurality of standard arch forms are represented by following cubic functions and have different coefficients $\beta_1$ and $\beta_2$ from one another, $$y=\beta_1 \times x^3+\beta_2 \times x^2 (x>0)$$

$$y=-\beta_1 \times x^3+\beta_2 \times x^2 (x<0).$$

15. The device according to claim 14, wherein the processor is configured to determine a curve expressed as the cubic function that is most similar to the patient's arch form made by connecting the Facial Axis (FA) points of the respective teeth and compare the curve with the plurality of standard arch forms.

16. The device according to claim 15, wherein the processor is configured to determine the curve that is most similar to the patient's arch form, based on a minimal value of an area or distance of a space made by overlaying the plurality of standard arch forms and the patient's arch form on top of each other.

17. The device according to claim 16, wherein the processor is configured to select the standard arch form that has the most similar curvature to the curve, based on a difference between the coefficients $\beta 1$ and $\beta 2$ of the standard arch forms and the coefficients $\beta 1$ and $\beta 2$ of the curve.

18. The device according to claim 11, wherein the processor is configured to distinguish the patient's teeth from a gum.

19. The device according to claim 14, wherein the plurality of standard arch forms comprises three standard arch forms having different values of coefficients $\beta 1$ and $\beta 2$ from one another on each of the upper and lower jaws.

20. The device according to claim 11, wherein the processor is configured to produce the two-dimensional reference plane where an E value calculated by a following expression with the vertical distances $e_1$ to $e_n$ from the Facial Axis (FA) points is minimal, $$E=\sqrt{e_1^2+e_2^2+e_3^2+...+e_n^2}.$$

* * * * *